Jan. 21, 1958 C. G. SCHAAF 2,820,499
FLOATING, SWIVELLING ANCHOR NUT
Filed Dec. 17, 1954
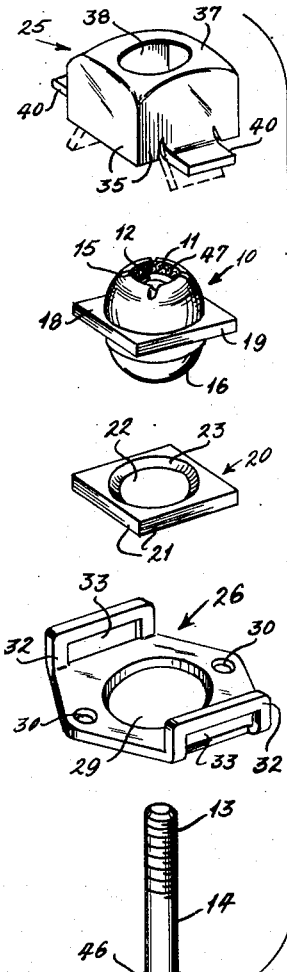
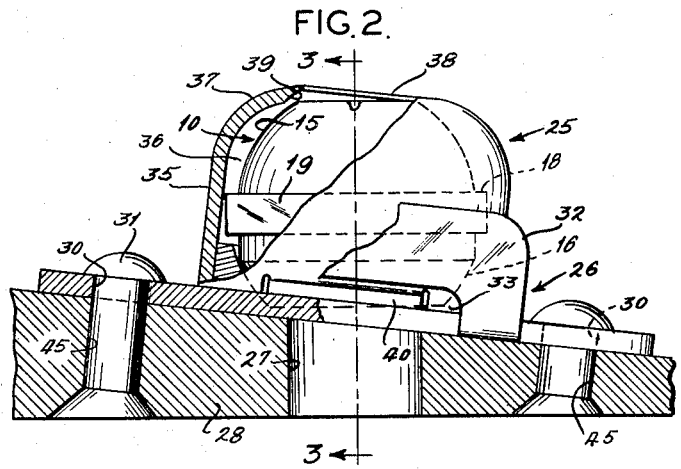
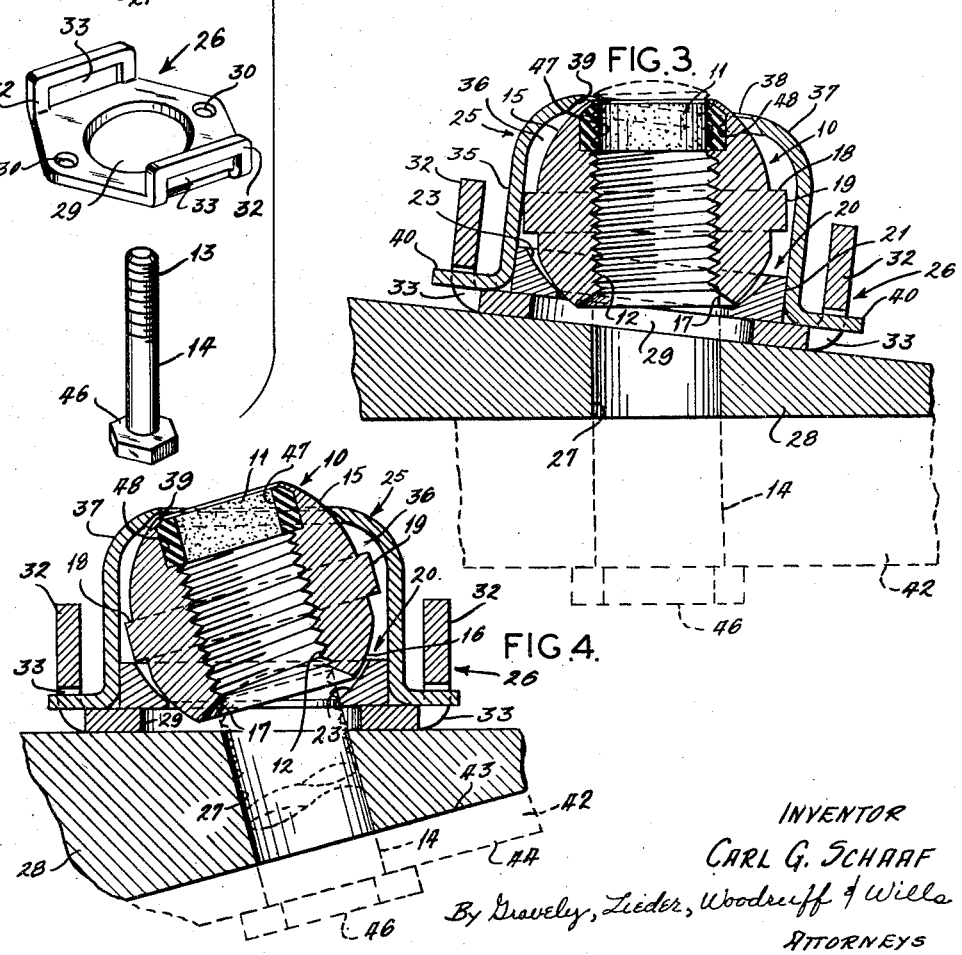
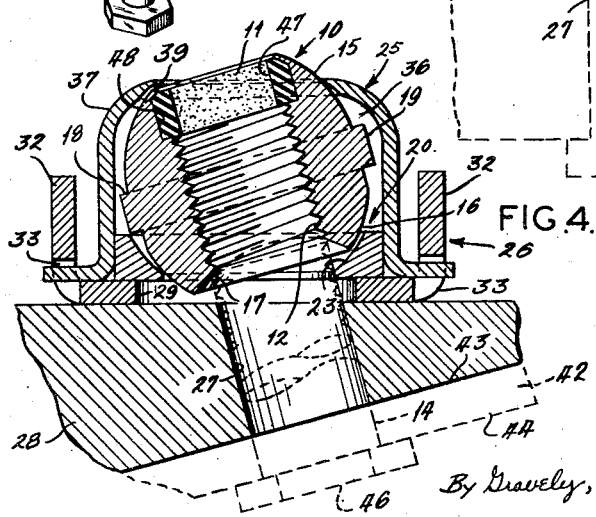
INVENTOR
CARL G. SCHAAF
By Gravely, Lieder, Woodruff & Wills
ATTORNEYS

United States Patent Office 2,820,499
Patented Jan. 21, 1958

2,820,499

FLOATING, SWIVELLING ANCHOR NUT

Carl G. Schaaf, Kirkwood, Mo., assignor to McDonnell Aircraft Corporation, St. Louis, Mo., a corporation of Maryland Application December 17, 1954, Serial No. 475,893

2 Claims. (Cl. 151—41.7)

This invention relates generally to the fastening art and more particularly to a novel floating anchor nut for the blind fastening of tapered parts.

In present shop practice it is difficult to attach a nut normal to the axis of a bolt or screw and at the same time insure that the face of the nut will bear nearly uniformly on the surface of the part being assembled. This result may be caused by variations in sheet metal surfaces, it may be due to draft angles or other variations in the surfaces of forgings or castings, or it sometimes arises by reason of misalignment in the drilling of the openings for a bolt in two or more materials to be secured thereby.

In the production of high speed aircraft this problem becomes acute because of the streamlined configurations thereof, and many attachment screws or bolts must be mounted on structural elements which have twisted or tapered surfaces. When a bolt is tightened by a nut which does not have nearly uniform surface bearing, the bolt is subjected to bending in addition to the normal tension or shear loads it is expected to carry. In assemblies such as found in aircraft, where it is important to prevent load or fatigue failure of the attachment, it is important that bending be avoided in the attaching bolts or screws. The obvious method of eliminating this problem is to spot-face the surfaces of the metal seats so that both the bolt-head and the nut will be normal to the axis of the bolt when tightened against the parts being secured. However, accurate spot-facing is an expensive and difficult operation, and has an additional disadvantage in that the necessary machining often leaves a concentration-of-stress condition in the part which has been spot-faced.

Another related problem constantly recurring in the production of high speed aircraft is securing threaded type fasteners where access to one end of the fastener, such as the nut location, has been restricted by the structural shape of certain parts or by the order followed in assemblying the elements in a construction. In such instances, it is not only difficult for the operator to grasp the nut but, in addition, it is often impossible for him to observe the attachment being made. Such a "blind fastening" frequently has to be made regardless of the sequence of assembling parts, and presents a serious obstacle in the safe and efficient production of aircraft.

One of the principle objects of this invention is to provide a threaded fastener having a full floating swivel anchor nut to obviate the necessity of back spot-facing parts having irregular surfaces on which a standard nut would not properly seat.

It is also an object of the present invention to provide a novel anchor nut which will be prevented from rotating with a bolt being tightened thereto.

Another object is to provide a full floating swivel anchor nut which will obviate the problem of making blind fastenings.

Another object of this invention is to provide an anchor nut pivotally seated to facilitate the automatic alignment of the nut with the axis of a bolt being tightened thereto.

Still another object of this invention is to provide a threaded fastener with an anchor nut having torque transferring means for transmitting the force imparted to the nut by the rotation of the bolt to the element being fastened thereby.

These and other objects and advantages will become apparent hereinafter.

The invention comprises an anchor nut swivelly positioned on a thrust seat and restricted from rotational movement by an enclosing retainer suitably mounted on an element to be fastened by the nut, and it also comprises the retainer in such form as to permit swivelling action for the anchor nut.

The invention also consists in the parts and in the arrangements and combinations of parts hereinafter described and claimed. In the accompanying drawings which form a part of this specification and wherein like numerals refer to like parts wherever they occur:

Fig. 1 is an exploded perspective view of the components embodying the principles of this invention;

Fig. 2 is a sectional elevational view, partly broken away, showing the assembled components mounted on an element to be fastened;

Fig. 3 is a sectional elevational view of the anchor nut and retaining means, as taken along line 3—3 of Fig. 2; and Fig. 4 is a view similar to Fig. 3, but showing the anchor nut and bolt in an extreme condition of assembly.

Referring now to the drawings in detail, Fig. 1 shows an anchor nut 10 having a bore 11 extending longitudinally between opposed ends of the nut. The bore 11 is threaded as at 12 for receiving the threaded end 13 of a machine screw or bolt 14 therein. The nut 10 has a spherical portion or crown 15 formed on one end, and a spherical seat 16 formed on the opposite end. A frusto-conical opening 17 (Fig. 3) is formed in the nut 10 at the seat end extending upwardly to the bore 11. A bearing plate or torque transferring flange 18 having side walls 19 is provided on the nut 10 intermediate the crown 15 and the seat 16.

A thrust washer 20 is provided as an abutment member for the seat end 16 of nut 10. The washer 20 may be suitably shaped and has side walls 21 of greater length than the side walls 19 of the torque flange 18. The washer 20 has a central opening 22 through which the bolt 14 may be inserted for threaded engagement with the nut 10, and the side wall or abutment 23 of the opening 22 is spherically formed to provide an abutment surface for cooperative engagement by the spherical seat 16 formed on the nut 10.

A retainer shell 25 and a shell mounting plate 26 are provided for positioning the nut 10 and washer 20 in cooperating relationship with an opening 27 (Figs. 2, 3 and 4) in an element 28 to be secured to a part or element 42. The mounting plate 26 (Fig. 1) has a central opening 29 formed therein having a larger diameter than that of the opening 27 in the part 28. Openings 30 are provided in the mounting plate 26 outwardly of the central opening 29 for securing the plate 26 to the part 28, such as by rivets 31 (Fig. 2) or other suitable fastenings. Upwardly-turned flanges 32 are formed on opposed sides of the mounting plate 26, each flange 32 having a longitudinal opening 33 therein (Figs. 1 and 3).

The retainer shell 25 has side walls 35 defining a central cavity 36 therein for positioning the anchor nut 10 on the element 28. The retainer 25 has a top surface 37 formed integral with the side walls 35 and having an opening 38 centrally located therein for permitting the passage of the bolt 14 when tightened in relation with the nut 10. A spherical side wall or abutment 39 (Figs. 2, 3 and 4) is provided adjacent to the opening 38 in the retainer 25 for co-action with the spherical crown 15 of the nut 10 in permitting unrestricted relative movement therebetween. The retainer 25 has a detent or ear 40 formed on each of two opposed side walls 35 in conterminous relationship therewith prior to mounting the nut 10 on the element 28. When the retainer 25 is in assembled position on the mounting plate 26, the detents 40 are bent to extend (full line in Fig. 1) through the openings 33 formed in the opposed upwardly-turned flanges 32 on the mounting plate to prevent the rotation of the retainer 25 relative thereto when the bolt 14 is being tightened on the nut 10.

In preparing the element 28 for fastening to another element 42 having opposed surfaces 43 and 44, the mounting plate 26 is secured to the element 28 by rivets or the like, which are positioned in the openings 30 in the mounting plate 26 and similar openings 45 (Fig. 2) in the element 28. When secured, the central opening 29 in the mounting plate is axially aligned, but not necessarily concentric, with the opening 27 in the element 28.

The thrust washer 20 and the anchor nut 10 are abutted together so that the spherical seat 16 of the nut is engaged on the spherical abutment 23 of the washer 20. When so arranged, the washer 20 and the nut 10 are inserted into the cavity 36 within the retainer 25 so that the spherical crown 15 is engaged on the spherical abutment surface 39 of the retainer, and the side walls 19 of the flange 18 and 21 of the washer 20 are adjacent the inner surface of the side wall 35 of the retainer. The side walls 21 of the washer 20 are in abutted relation with the side walls 35 of the retainer to prevent relative movement therebetween, whereas the side walls 19 of the torque flange on the nut, being shorter than the side walls 21, are spaced from the side walls 35 so that full pivotal movement between the nut and the retainer will be permitted. However, the walls of the torque flange are of sufficient length to prevent rotational movement of the nut 10 within the retainer as will be seen hereinafter. When the washer 20 has been assembled in the retainer 25 so that their side walls 21 and 35, respectively, are abutted, a fixed relationship between the opening 22 in the washer and the opening 38 in the retainer will exist. In particular, the plane of the opening 22 will be substantially parallel with the plane of the opening 38, and they will be axially and concentrically aligned.

The detents 40 formed on the retainer 25 are flared outwardly from their conterminous relationship with side walls 35, as indicated by broken lines in Fig. 1, and the retainer 25 with the nut 10 and washer 20 positioned therein is then placed on the mounting plate 26 so that the ends of the detents 40 are adjacent to the longitudinal openings 33. The detents 40 of the retainer 25 are then bent outwardly into a right angular relationship with the side walls 35 in such a manner as to position the detents 40 in the openings 33 of the mounting plate 26. When so positioned, the detents will project through the flanges 32 and prevent relative separation between the retainer 25 and the mounting plate 26, although an initial pivotal movement of the retainer may take place when the bolt 14 is tightened to the nut 10. The pivotal movement may occur because the length of the openings 33 in the flanges 32 is greater than the width of the detents 40, which also provides for the adjustment or repositioning of the retainer 25 on the mounting plate 26 to compensate for taper in the element 28 in the direction of the flanges 32. Furthermore, the distance between the opposed sidewalls 35 of the retainer 25 is less than the distance between the inner surfaces of the flanges 32 of the mounting plate 26 to provide crosswise movement of the retainer between the flanges to compensate for taper of the element 28 in that direction. Therefore, the retainer is loosely mounted between the flanges so that it may be repositioned relative to the mounting plate 26 when the openings 22 and 38 in the washer 20 and retainer 25 are not aligned with the opening 29 in the mounting plate previous to the insertion of the bolt 14 for tightening on the nut 10, as will be presently described.

It is now apparent that the mounting plate 26, the washer 20, and the retainer 25 comprise the retaining means for mounting the nut 10 on the element 28, and when so mounted it will be loosely positioned and in no way restricted from free pivotal movement by surfaces of the retaining components bearing against it. However, when initially mounted, the bore 11 of the nut 10 may be disposed at any angular position relative to the openings in the other fastening components inasmuch as the nut 10 is free to pivot or swivel in the retaining means.

For the purposes of this disclosure the element 28 (Figs. 2 and 3) is shown to have opposed faces which are angularly related to form a taper, whereas the element 42 to be secured thereto has opposite parallel surfaces, as at 43 and 44. However, any irregularly shaped parts or elements may be secured by the present anchor nut arrangement, provided that the opening in the element 42 or its equivalent is formed perpendicular to the outside surface (44) so that the bolt-head 46 will bear evenly thereagainst.

When the bolt 14 is inserted (Figs. 3 and 4) through the openings in the elements 42 and 28 and through the opening 29 in the mounting plate 26, which may be concentric with the openings in the elements, it will contact the nut 10 either on the frusto-conical surface 17 or correctly in the threaded bore 11, depending on the position of the retainer and the nut on the mounting plate. If the nut 10 is not positioned so that its bore 11 is substantially axially aligned with the axis of the bolt 14, the bolt 14 will contact the frusto-conical surface 17, rather than entering the threaded bore 11 directly, and the force exerted thereagainst by the insertion of the bolt will cause the nut to be pressed or pushed against the spherical abutment 39 within the retainer 25 until the axes of bore 11 and screw 14 are substantially aligned and in condition to threadedly engage without binding or imposing any distorting or bending forces on the screw.

As shown in Figs. 3 and 4, annular locking means 47 may be provided in the bore 11 adjacent the crown end of the nut 10 to prevent the bolt 14 from becoming loosened therein due to vibration or the like. The locking means 47 may be composed of fiber, nylon or hard rubber and may be disposed in an annular counterbore 48. When so positioned the annular locking means 47 will extend inwardly from the counterbore 48 so that its inner opening will be engaged by the threaded end 13 of bolt 14 as it is tightened on the nut 10.

It is apparent that prior to the insertion of the bolt 14, the retainer 25 will be positioned in abutting relation with the mounting plate 26 provided the upper surface of the element 28 is disposed in a horizontal plane; and additionally, the retainer may be located thereon in any position permitted by the difference in the distances between the flanges 32 and the retainer side walls 35 and between the openings 33 and the detents 40. Upon insertion of the bolt 14 into contact with the nut 10, the retainer 25 will be displaced from or moved relative to the mounting plate 26 to the extent permitted by the connection between the detent 40 and the opening 33 (Fig. 3) therefor. The displacement of the retainer 25 facilitates nut movement relative to the mounting plate 26 and consequent adjustment into position for alignment of the nut bore with the screw and the accommodation of the screw in the respective openings of the thrust washer 20 and retainer 25.

As shown in Figs. 2, 3 and 4, regardless of the angular relationship of the nut 10 to the washer 20, the spherical seat 16 of the nut will be engaged on the spherical abutment surface 23 of the washer as the nut is being tightened on the bolt 14, the thrust transferred to the washer by the nut being transmitted evenly to the mounting plate 26 and to the element 28. It is now apparent that the nut may be aligned with the axis of the bolt 14 merely by pressing the bolt or screw into the bore opening 17. This function of the nut is important as it prevents bending the bolt and positively assures that it will bear evenly on the tapered element 28 being secured thereby.

The degree of taper of the element 28 for which the retaining means will compensate will determine the size of the openings in the retaining means, provision being made for sufficient abutment surface 23 for seating the nut 10 and enclosure of the nut 10 by the retainer 25 for making blind fastenings. Fig. 4 represents the maximum degree of taper which may be compensated for by the retaining means, it being seen that the bolt 14 just has sufficient clearance on one side of the opening 22 in the washer 20 and the diagonally opposite side of the opening 38 in the retainer 25.

Another important function of the retainer 25 is to prevent the rotational movement of the nut 10 relative to the bolt 14, and simultaneously to transmit the torque placed upon the nut back to the element 28. When the threaded end of the bolt 14 is initially engaged in the threaded portion 12 of the bore 11, the nut 10 will turn with the bolt until diagonally opposite corners of the side walls 19 of the torque flange 18 engage the side walls 35 of the retainer 25, whereby the initial pivotal movement of the retainer 25 is effected so that the detents 40 formed on the retainer are moved in the openings 33 until diagonally opposite corners of the side walls 35 move into engagement with the inner surfaces of the flanges 32 of the mounting plate 26. It is therefore obvious that the rotation of the bolt 14 in the nut 10 will cause the torque transferred to the nut to be transmitted to the retainer 25 and from the sides 35 of such retainer to the flanges 32 and then to the element 28.

This invention is intended to cover all changes and modifications of the example of the invention herein chosen for the purposes of the disclosure, which do not constitute departures from the spirit and scope of the invention.

What I claim is:

1. Anchor nut retaining means for mounting on an element having an opening for a screw formed therein; said retaining means comprising a mounting plate adapted to be secured to the element and having an opening registering with the opening in the element, upturned flanges on opposed sides of said mounting plate, and openings formed in said flanges; a retainer shell having substantially flat side walls defining a polygonal central cavity, a top portion of said shell having a central opening with a spherically formed surface, and detents formed on opposed side walls and positioned in the openings in said flanges of the mounting plate to provide lateral movement therebetween; a washer mounted in said retainer shell and positioned on said mounting plate, said washer having an opening formed to provide a spherically formed abutment surface, the plane of the opening in the washer being parallel with the plane of the opening in the retainer shell; and an anchor nut positioned in said retainer shell and having opposed ends with a threaded bore extending therebetween, a spherical crown formed on one end of the nut receivable in and having a working fit with the spherically formed surface of the opening in said retainer shell, a spherical seat formed on the other end and engageable with the abutment surface of the washer to transmit screw tightening forces therethrough to said element, and a flange intermediate said opposed ends and substantially perpendicular to the axis of said bore, said flange having substantially flat side walls of relatively narrow breadth and spaced from the side walls of said retainer shell to permit relative rocking movement between said retainer shell and nut but adapted to contact the side walls of the retainer shell to permit only limited relative rotation of the nut and shell.

2. Anchor nut retaining means for mounting on an element having an opening for a screw therein; said retaining means comprising a perforated mounting plate and a retainer shell having cooperative means to secure the latter to the former and permit limited relative lateral movement therebetween, said mounting plate being adapted to be secured to the element to position the retainer shell over the opening therein, said retainer shell having substantially flat side walls defining a polygonal central cavity and a top wall with a central opening having a spherically formed surface; a washer mounted in said retainer shell and positioned on said mounting plate, said washer having an opening with a spherically formed abutment surface; and an anchor nut positioned in said retainer shell and having opposed spherically formed crown and seat ends and a threaded bore extending therebetween, the spherical crown end being receivable in and having a working fit with the spherically formed surface of the retainer shell opening, and the spherical seat end being engageable with the abutment surface of the washer to transmit screw tightening forces to said mounting plate and the element, and a flange intermediate the opposed ends and substantially perpendicular to the axis of said bore, said flange having relatively narrow substantially flat side walls spaced from the retainer shell side walls to permit relative rocking movement between said retainer shell and nut but adapted to contact said retainer shell side walls to permit only limited relative rotation between said nut and retainer shell.

References Cited in the file of this patent

UNITED STATES PATENTS

| | | |
|---|---|---|
| 1,399,942 | Dowd | Dec. 13, 1921 |
| 1,412,502 | Andrioli | Apr. 11, 1922 |
| 2,144,553 | Simmonds | Jan. 17, 1939 |
| 2,243,923 | Swanstrom | June 3, 1941 |
| 2,249,923 | Whitcombe | July 22, 1941 |
| 2,339,130 | Albin | Jan. 11, 1944 |
| 2,429,833 | Luce | Oct. 28, 1947 |
| 2,502,365 | Bard | Mar. 28, 1950 |

FOREIGN PATENTS

| | | |
|---|---|---|
| 129,513 | Great Britain | July 17, 1919 |